United States Patent
Wang et al.

(10) Patent No.: US 9,158,368 B2
(45) Date of Patent: Oct. 13, 2015

(54) ENERGY-SAVING DEVICE AND METHOD FOR PORTABLE TERMINAL

(75) Inventors: Xiaowei Wang, Shenzhen (CN); Tianci Yin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 211 days.

(21) Appl. No.: 13/981,462

(22) PCT Filed: Aug. 24, 2011

(86) PCT No.: PCT/CN2011/078820
§ 371 (c)(1),
(2), (4) Date: Jul. 24, 2013

(87) PCT Pub. No.: WO2012/100529
PCT Pub. Date: Aug. 2, 2012

(65) Prior Publication Data
US 2013/0311803 A1 Nov. 21, 2013

(30) Foreign Application Priority Data
Jan. 25, 2011 (CN) .......................... 2011 1 0027482

(51) Int. Cl.
*G06F 1/32* (2006.01)
*H04W 52/02* (2009.01)

(52) U.S. Cl.
CPC ............ *G06F 1/3296* (2013.01); *G06F 1/3212* (2013.01); *G06F 1/3234* (2013.01); *H04W 52/0261* (2013.01); *H04W 52/0258* (2013.01); *Y02B 60/1292* (2013.01); *Y02B 60/50* (2013.01)

(58) Field of Classification Search
CPC ... G06F 1/3212; G06F 1/3234; G06F 1/3296; H04W 52/0258; H04W 52/0261; Y02B 60/1292; Y02B 60/50
See application file for complete search history.

(56) References Cited

U.S. PATENT DOCUMENTS

| 6,697,953 | B1 | 2/2004 | Collins |
| 7,017,061 | B2 * | 3/2006 | Lippert et al. ................ 713/324 |

(Continued)

FOREIGN PATENT DOCUMENTS

| CN | 1633636 | 6/2005 |
| CN | 101344814 | 1/2009 |

(Continued)

OTHER PUBLICATIONS

International Search Reprot for PCT/CN2011/078820, English translation attached to original, Both completed by the Chinese Patent Office on Nov. 15, 2011, All together 7 pages.

*Primary Examiner* — M Elamin
(74) *Attorney, Agent, or Firm* — Brooks Kushman P.C.

(57) ABSTRACT

An energy-saving apparatus and method for a portable terminal are disclosed in the present document. The apparatus includes: an electricity meter module, configured to detect battery power consumption parameters under driving of a data acquisition module; the data acquisition module, configured to drive the detection of the electricity meter module, and output the collected battery power consumption parameters to a data analysis module; the data analysis module, configured to estimate power consumptions of all running devices at present in the terminal according to the input battery power consumption parameters, and output a power consumption optimization instruction to a power consumption optimization execution module; and the power consumption optimization execution module, configured to adopt corresponding power consumption optimization approaches according to the input power consumption optimization instruction.

10 Claims, 2 Drawing Sheets

(56) References Cited

U.S. PATENT DOCUMENTS

| | | |
|---|---|---|
| 7,366,921 B2 * | 4/2008 | Ranganathan ................ 713/300 |
| 7,389,439 B2 * | 6/2008 | Yoon et al. .................... 713/323 |
| 8,958,854 B1 * | 2/2015 | Morley et al. ................. 455/574 |
| 2003/0158609 A1 | 8/2003 | Chiu |
| 2009/0013204 A1 | 1/2009 | Kobayashi et al. |
| 2009/0098914 A1 | 4/2009 | Martin-Cocher et al. |
| 2009/0164152 A1 | 6/2009 | Creus et al. |

FOREIGN PATENT DOCUMENTS

| | | |
|---|---|---|
| CN | 101458406 | 6/2009 |
| CN | 101808165 | 8/2010 |
| CN | 101903845 | 12/2010 |
| CN | 102098392 | 6/2011 |

* cited by examiner

ENERGY-SAVING DEVICE AND METHOD FOR PORTABLE TERMINAL

CROSS-REFERENCE TO RELATED APPLICATION

This application is the U.S. national phase of PCT Appln. No. PCT/CN2011/078820 filed Aug. 24, 2011 which claims priority to Chinese Application No. 201110027482.6 filed Jan. 25, 2011, the disclosures of which are incorporated in their entirety by reference herein.

TECHNICAL FIELD

The present document relates to the technical field of portable terminal and embedded system, and particularly, to an energy-saving apparatus and method for the portable terminal.

BACKGROUND OF THE RELATED ART

With the rapid development of technologies such as the embedded technology and mobile communication technology and so on, functions of portable terminals such as mobile phones are increasing constantly, for example, smartphones which have strong function extensibility are very popular among the majority of users.

However, a series of the 3rd-Generation (3G) network applications such as a color screen with large size and high definition, a processor with faster speed, a media player function, Wireless Fidelity (WiFi) or a bluetooth function and a mobile television possessed by the smartphones all will consume a great amount of electrical energy at the present. The durability of battery has gradually become a bottleneck of the development of all the smartphones.

Moreover, with regard to almost all the mobile phones including the smartphones nowadays, the battery power is displayed by using a simple bar diagram, and it is so rough that the situation of the actual operation of the battery supply changing over time cannot be reflected, which makes the user experience pretty poor.

According to the needs of implementing more functions and applications, how the mobile phones displays the electrical power of battery in real time and reduces the power consumption of battery to further enhance the user experience has become one of focuses in the industry.

Currently, in the existing technical schemes, one part is to begin with certain partial components of the terminal and perform local adjustment on the power consumption; and another part is that the terminal displays the power consumption and electrical power of the battery through data acquisition and a plurality of algorithms.

With regard to the former scheme mentioned above, for example, with the concept of energy-saving charger for terminal raised by the Changhong Electric Co., Ltd., the efficiency of battery charging is optimized; for another example, in the Chinese patent CN200710172331.3: Light sensation energy saving system and light sensation energy saving implementation method in mobile phone, light sensors are used to judge the external light intensity, and adjustment is performed on the power consumption of components such as Liquid Crystal Display (LCD) backlight and button light and so on; some other mobile phones optimize the power consumption by improving the circuit design and manufacturing process and so on. All the above schemes can only perform local adjustment on the power consumption in the mobile phones, but they are extremely limited for power consumption optimization of the entire mobile phone.

With regard to the latter scheme mentioned above, for example, with the softwares Nokia Energy Profiler developed by the Nokia with respect to their own mobile phone products, data such as the power consumption and supply voltage of the battery can be tested in real time, and the current battery life can be estimated based on this; and users can use these application softwares to observe the electrical power of the mobile phone battery at any time. Though a power consumption status of the mobile phone can be queried globally with these schemes, since it is required to collect and calculate the electrical power to run such software, on one hand, the data will not be totally accurate, and on the other hand, additional burden also will be added to a Central Processing Unit (CPU), thereby increasing the terminal power consumption; meanwhile, these application softwares also will cause certain faults at times. Moreover, these application softwares are short of interactivity, and it is not easy for the general users to comprehend the given power consumption data, thus it is also difficult for the users to make corresponding responses, thereby failing to achieve the purpose of saving energy for the terminal in use.

SUMMARY OF THE INVENTION

The technical problem required to be solved by the present document is to provide an energy-saving apparatus and method for a portable terminal, which can achieve the purpose of saving energy for the terminal in use.

In order to solve the above technical problem, the present document provides an energy-saving apparatus for a portable terminal, which comprises an electricity meter module, a data acquisition module, a data analysis module and a power consumption optimization execution module, wherein:

the electricity meter module is configured to: detect battery power consumption parameters under driving of the data acquisition module;

the data acquisition module is configured to: drive the detection of the electricity meter module, and output the collected battery power consumption parameters to the data analysis module;

the data analysis module is configured to: estimate power consumptions of all currently running devices in the terminal according to the input battery power consumption parameters, and output a power consumption optimization instruction to the power consumption optimization execution module; and the power consumption optimization execution module is configured to: adopt corresponding power consumption optimization approaches according to the input power consumption optimization instruction.

Preferably, the battery power consumption parameters detected by the electricity meter module at least comprise a battery current;

the data analysis module is configured to: solve an average current of the battery currents collected by the data acquisition module at regular intervals, compare an average current of a current time period with an average current of a last time period to obtain a difference value, and corresponding to distinctions of all the running devices between the former time period and the latter time period or corresponding to differences between pre-measured current consumptions of all the running devices, obtain current consumptions of all the currently running devices to serve as corresponding power consumption estimations, and form power consumption information records of all the running devices.

Preferably, the apparatus further comprises a function setting module, wherein:

the function setting module is configured to: provide energy-saving function customization options for a user through a man-machine interface, and output the energy-saving function customization options selected by the user on the man-machine interface to the data analysis module; the energy-saving function customization options at least comprise power consumption automatic optimization enabling options;

the data analysis module is configured to: compare the battery power consumption parameters collected by the data acquisition module with corresponding preset alarm standard parameters, if the collected battery power consumption parameters exceed the corresponding alarm standard parameters, analyze the power consumptions of all the currently running devices, determine power consumption optimization approaches required to be adopted, and determine whether to perform power consumption optimization operation according to the input energy-saving function customization options.

Preferably, the apparatus further comprises a data display module, wherein:

the battery power consumption parameters detected by the electricity meter module further comprise one or two parameters of a battery voltage and a battery temperature;

the energy-saving function customization options provided by the function setting module further comprise one or more of data display options and power consumption reminding options; the function setting module is further configured to output the energy-saving function customization options to the data display module;

the data analysis module is further configured to: output a data display instruction to the data display module according to the data display options; output a window prompt instruction to the data display module according to the power consumption reminding options; and output a corresponding power consumption optimization instruction to the power consumption optimization execution module according to the power consumption automatic optimization enabling options;

the data display module is configured to: display a prompt window according to the window prompt instruction to remind the user to execute the power consumption optimization approaches; and display at least one or more parameters of the battery current, battery temperature and battery voltage in the battery power consumption parameters in real time according to the data display instruction.

Preferably, the data display options provided by the function setting module comprise data display enabling and all displaying subitems, all the displaying subitems comprise displaying one or more of the detected battery power consumption parameters, a maintainable remaining duration of use of the battery and a remaining duration required for fully charging the battery in a charging state; and the power consumption reminding options comprise power consumption reminding enabling, reminding an opened but unused device and reminding whether to execute the power consumption optimization approaches;

the prompt window displayed by the data display module comprises reminding the opened but unused device and reminding whether to execute the power consumption optimization approaches; and the parameters displayed in real time further comprise the maintainable remaining duration of use of the battery and the remaining duration required for fully charging the battery in the charging state.

Preferably, the data analysis module is configured to: when the average current of the current time period is greater than a preset threshold value, according to information records of all the currently running devices and the power consumption thereof, adopt any one of following approaches:

when determining that power consumption reminding is required to be performed according to the power consumption reminding enabling and corresponding reminding subitems, reminding the user of whether to close the long-term opened but unused device and/or reminding whether to execute the power consumption optimization approaches through the prompt window displayed by the data display module;

according to response information on the prompt window of the user returned by the data display module or according to the power consumption automatic optimization enabling options, executing any one or more of following power consumption optimization operations through the power consumption optimization execution module:

with respect to multiple idle but opened devices currently existing in the terminal, preferentially closing a device with the longest idle time through the power consumption optimization execution module, or preferentially closing a device with the minimal impact on user experience.

with respect to a state that display screen brightness is comparatively high at present, progressively reducing the display screen brightness through the power consumption optimization execution module, and/or progressively reducing power consumptions of other devices.

In order to solve the above technical problem, the present document provides an energy-saving method for a portable terminal, which comprises:

collecting battery power consumption parameters detected by an electricity meter;

estimating power consumptions of all currently running devices in the terminal according to the collected battery power consumption parameters; and determining power consumption optimization approaches required to be adopted according to the estimated power consumptions of all currently running devices.

Preferably, the collected battery power consumption parameters detected by the electricity meter at least comprise a battery current; and the step of estimating power consumptions of all currently running devices in the terminal according to the collected battery power consumption parameters comprises:

solving an average current of the battery currents at regular intervals, comparing an average current of a current time period with an average current of a last time period to obtain a difference value, and corresponding to distinctions of all the running devices between the former time period and the latter time period or corresponding to differences between pre-measured current consumptions of all the running devices, obtaining current consumptions of all the currently running devices to serve as corresponding power consumption estimations, and forming power consumption information records of all the running devices.

Preferably, the step of determining power consumption optimization approaches required to be adopted according to the estimated power consumptions of all currently running devices comprises:

if the average current within the current time period is greater than a preset threshold value, according to information records of all the currently running devices and the power consumption thereof, determining one or more of following power consumption optimization approaches required to be executed:

with respect to multiple idle but opened devices currently existing in the terminal, preferentially closing a device with the longest idle time through the power consumption optimization execution module, or preferentially closing a device with the minimal impact on user experience.

with respect to a state that display screen brightness is comparatively high at present, progressively reducing the display screen brightness through the power consumption optimization execution module, and/or progressively reducing power consumptions of other devices.

Preferably, before collecting the battery power consumption parameters detected by the electricity meter, the method further comprises:

providing energy-saving function customization options for a user through a man-machine interface, and acquiring the energy-saving function customization options selected by the user on the man-machine interface, wherein, the energy-saving function customization options comprise one or more of power consumption automatic optimization enabling options, data display options and power consumption reminding options; wherein, the data display options comprise data display enabling and all displaying subitems, all the displaying subitems comprise displaying one or more subitems of the detected battery power consumption parameters, a maintainable remaining duration of use of battery and a remaining duration required for fully charging the battery in a charging state; and the power consumption reminding options comprise each subitem of power consumption reminding enabling, reminding an opened but unused device and reminding whether to execute the power consumption optimization approaches.

Preferably, after determining the power consumption optimization approaches required to be adopted, the method further comprises:

performing corresponding data display, power consumption reminding and power consumption optimization operations according to the energy-saving function customization options set by the user.

Preferably, the collected battery power consumption parameters detected by the electricity meter further comprise one or two parameters of the battery voltage and the battery temperature; and the step of performing corresponding data display, power consumption reminding and power consumption optimization operations according to the energy-saving function customization options set by the user comprises specifically:

displaying one or more parameters of the battery power consumption parameters, the maintainable remaining duration of use of the battery and the remaining duration required for fully charging the battery in the charging state in real time according to the data display options;

displaying a prompt window according to the power consumption reminding options, and reminding the user to close the opened but unused device and reminding whether to execute the power consumption optimization approaches; and according to response information on the prompt window of the user or according to the power consumption automatic optimization enabling options, executing the determined power consumption optimization approaches.

Compared with the related art, in the present document, complicated circuit designs are not required, and it is only required to add an electricity meter chip with minimum power consumption and low costs to the circuit of the original terminal, by the electricity meter chip performing data acquisition, not only a large amount of adequate power consumption information can be acquired to guarantee the data accuracy, but also the CPU consumption can be saved, which is easy to implement; by performing operations such as analysis, display and power consumption optimization on the acquired power consumption information, positioning and optimization can be performed on the power consumption from an overall perspective of the terminal, and a way of interacting with users can be used to make the power consumption information easier to be understood and operated by the users, which achieves the purpose of saving energy for the terminal in use.

Meanwhile, in the present document, real-time displaying is performed on the current consumed by the terminal, which can be convenient for the research personnel to perform monitoring and optimization on the power consumption parameters in the development process, avoid connecting with instruments such as multimeters and so on to perform measurement and detection every time after performing optimization on terminals in development, and greatly enhance the development efficiency of the terminals whose power consumptions are reduced.

PREFERRED EMBODIMENTS OF THE INVENTION

The technical scheme of the present document will be described in detail in combination with the accompanying drawings and preferred examples below. The examples illustrated below are only used to describe and explain the present document, but do not constitute a limitation on the technical scheme of the present document.

Figure 1:
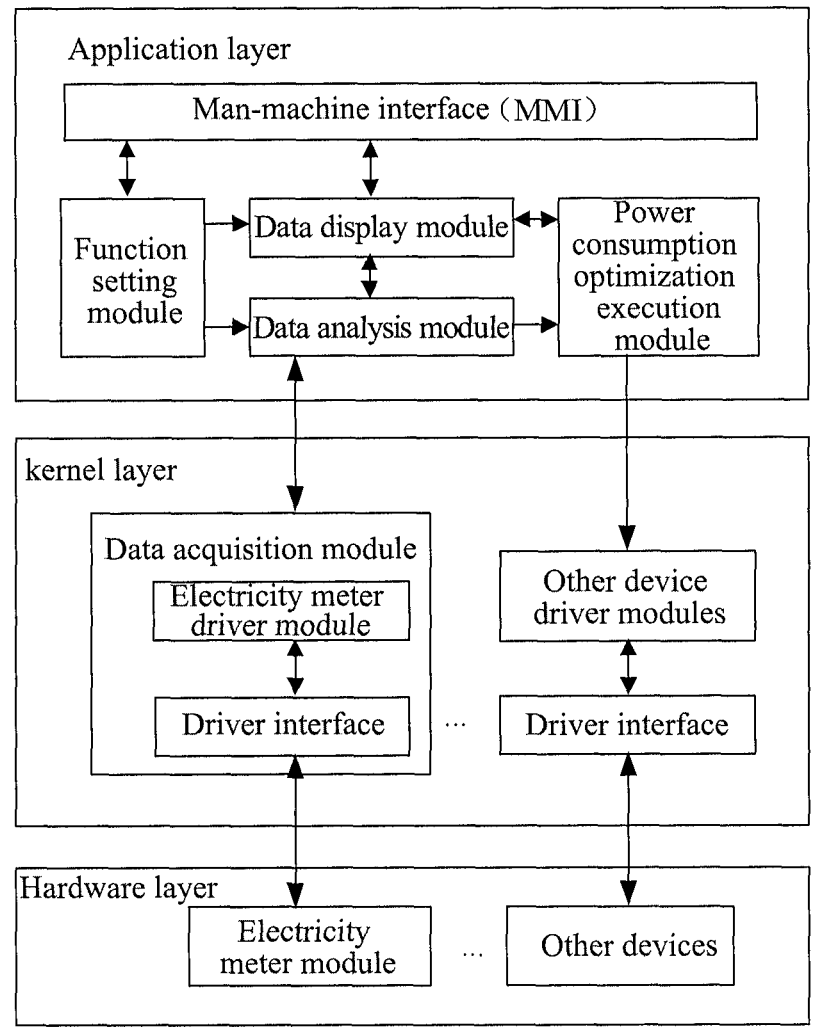
FIG. 1 is a block diagram of the structure of the example of an energy-saving apparatus for a portable terminal provided by the embodiment of the present document.

As shown in FIG. 1, it is the example of an energy-saving apparatus for a portable terminal provided by the embodiment of the present document, which includes an electricity meter module located in a hardware layer, a data acquisition module located in a kernel layer, and a data analysis module and a power consumption optimization execution module located in an application layer, wherein:

the electricity meter module is configured to: detect battery power consumption parameters under driving of the data acquisition module;

the battery power consumption parameters detected by the electricity meter module include one or more of the battery voltage, battery current, and battery temperature.

The data acquisition module is configured to: drive the electricity meter module to detect the battery power consumption parameters, and output the collected battery power consumption parameters to the data analysis module;

the data analysis module is configured to: estimate power consumptions of all currently running devices in the terminal according to the input battery power consumption parameters, and output a power consumption optimization instruction to the power consumption optimization execution module;

all the currently running devices in the terminal include all currently running application programs and/or peripheral equipments.

The power consumption optimization execution module is configured to: adopt corresponding power consumption optimization approaches according to the input power consumption optimization instruction.

Since all data related to the battery power consumption are detected by the electricity meter module (a dedicated chip), not only the CPU load of the terminal is relieved, but also correctness and accuracy of the detection data are guaranteed. Meanwhile, costs of the electricity meter module are not high and the power consumption is extremely low, which is comparatively applicable to a portable terminal which is similar to a mobile phone terminal.

The above example of the energy-saving apparatus for the portable terminal also includes a function setting module of the application layer, wherein:

the function setting module is configured to: provide energy-saving function customization options for a user through a Man-Machine Interface (MMI), and output the energy-saving function customization options selected by the user on the MMI to the data analysis module;

the energy-saving function customization options provided by the function setting module at least include power consumption automatic optimization enabling options. The power consumption automatic optimization enabling options are default options.

The data analysis module compares the battery power consumption parameters collected by the data acquisition module with corresponding preset alarm standard parameters, if the collected parameters exceed the corresponding alarm standard parameters, it further analyzes the power consumptions of all the currently running devices in the terminal, determines the power consumption optimization approaches required to be adopted, and determines whether to perform power consumption optimization operation according to the input energy-saving function customization options.

The above example of the energy-saving apparatus for the portable terminal also includes a data display module of the application layer, wherein:

the energy-saving function customization options provided by the function setting module also include one or more of data display options and power consumption reminding options; wherein, the data display options include data display enabling and all displaying subitems, all the displaying subitems includes displaying one or more subitems of the detected battery power consumption parameters, a maintainable remaining duration of use of battery and a remaining duration required for fully charging the battery in a charging state; and the power consumption reminding options include each subitem of power consumption reminding enabling, reminding a long-term opened but unused device and reminding whether to execute the power consumption optimization approaches;

when determining to perform data display according to the data display enabling and corresponding displaying subitems, the data analysis module outputs a data display instruction to the data display module; when determining to perform power consumption reminding according to the power consumption reminding enabling and corresponding displaying subitems, the data analysis module outputs a window prompt instruction to the data display module; and when determining to perform power consumption automatic optimization operation according to the power consumption automatic optimization enabling options, the data analysis module outputs a corresponding power consumption optimization instruction to the power consumption optimization execution module;

the data display module is configured to: display a prompt window according to the input window prompt instruction to remind the user of the long-term opened but unused device and/or remind whether to execute the power consumption optimization approaches; and display one or more of the detected battery power consumption parameters (battery temperature, battery voltage and battery current), the maintainable remaining duration of use of battery or the remaining duration required for fully charging the battery in the charging state in real time according to the input data display instruction.

The user can acquire the current power consumption condition of the terminal through the displayed parameters and directly adopt to turn off certain devices or application programs which are turned on but unused for a long time.

The user can customize a display interface for the data display module to display the information, for example, a dedicated interface can be used for displaying; some other information interfaces also can be used for displaying, for example, displaying on a main (home) interface of the terminal.

The data analysis module solves an average current of the currents consumed by the terminal in real time collected by the data acquisition module at regular intervals, compares the average current calculated within the current time period with the average current calculated within the last time period to obtain a difference value, and corresponding to distinctions of the running application programs or peripheral equipments (such as peripheral components including the LCD, motor and audio/video equipments and so on) between the former time period and the latter time period in the terminal or corresponding to differences between pre-measured current consumptions of all the devices, obtains current consumptions caused by different application programs and peripheral equipments in the terminal at present, and forms power consumption information records of all the devices.

If the average current consumed by the terminal within the current time period is greater than a preset threshold value (e.g., 160 ma), according to the information of the currently running application programs or peripheral equipments in the currently running terminal at the point and the power consumption information records of all the devices, the data analysis module adopts any one of the following approaches:

when determining to perform the power consumption reminding according to the power consumption reminding enabling and corresponding reminding subitems, reminding the user of the long-term opened but unused device and/or reminding whether to execute the power consumption optimization approaches through the prompt window displayed by the data display module;

according to response information on the prompt window of the user returned by the data display module or according to the power consumption automatic optimization enabling options, executing the following power consumption optimization operations through the power consumption optimization execution module:

with respect to multiple idle but opened application programs or devices currently existing in the terminal, preferentially closing an application program with the longest idle time through the power consumption optimization execution module, or preferentially closing a device with the minimal impact on user experience, and temporarily keeping the remaining application programs or devices opened;

with respect to a relative high LCD brightness at present, progressively reducing the LCD brightness through the power consumption optimization execution module, and with regard to other peripheral components, also progressively reducing power consumptions of the other peripheral components.

There exists a response key of the user determining whether to execute the power consumption optimization approaches on the interface of the prompt window, if the user is unwilling to perform power consumption optimization, a "cancel" key can be clicked directly, and if the user is willing to perform power consumption optimization, an "enter" key can be clicked.

The data analysis module will repeatedly enter the data acquisition and analytical calculation of the next time period. For example, within a regular interval of 30 mins, current consumed by the terminal in real time and collected by the data acquisition module is saved every other 2 s, all current data saved within the time period of 30 mins are accumulated, and the accumulation sum is divided by the accumulation times, thereby obtaining the average current within the time period.

If the user sets the power consumption optimization automatic execution in the MMI, the data analysis module will not remind the user through the data display module but will directly execute the power consumption optimization through the power consumption optimization execution module according to analytical calculation results, thus use by the user will not be interfered.

After executing the power consumption optimization operations through certain drives and corresponding driving interfaces, the power consumption optimization execution module will record the executed operations and output the operations to the data display module, so that the user can query which power consumption optimization operations are executed through the interface provided by the data display module in later period.

Therefore, in the embodiment, while the user experience is guaranteed, power consumption reminding of the terminal and optimization operations are performed, which achieves the energy-saving effect and enhances the battery life of the terminal.

Figure 2:
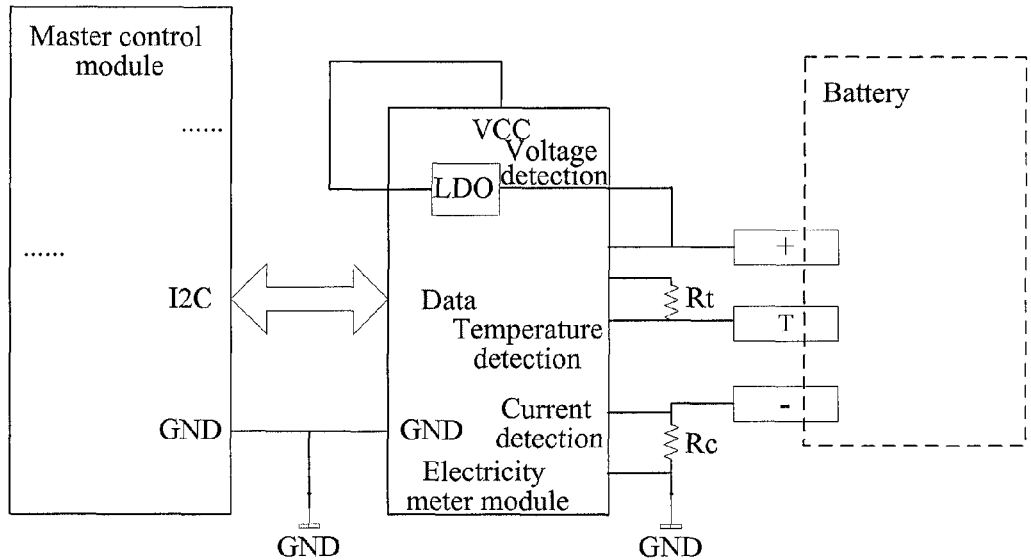
FIG. 2 is a diagram of line connections of a specific example of the energy-saving apparatus for the portable terminal shown in FIG. 1.

FIG. 2 represents line connections of a specific example of the energy-saving apparatus for the portable terminal shown in FIG. 1, wherein, a master control module is implemented on an android platform, which is used to implement the data acquisition module, data analysis module and power consumption optimization execution module in FIG. 1. The electricity meter module uses an electricity meter chip bq27510 of the Texas Instrument (TI) corporation.

A working principle of the electricity meter chip is that: a power supply terminal VCC supplies power to the electricity meter chip through a built-in Low Drop Out (LDO) through battery voltage of the terminal, once the battery is inserted to supply power, the electricity meter chip starts to work and detects power consumption parameters such as the battery voltage, battery temperature and battery current in real time through a corresponding sensor;

the master control module collects the power consumption parameters such as the battery voltage, battery temperature and battery current detected by the electricity meter chip through an interface I2C, analyzes the collected power consumption parameters, and calculates power consumptions of all the currently running devices; and determines whether to perform data display, power consumption reminding or power consumption optimization operation according to the energy-saving function customization options set by the user.

Wherein, a principle of the electricity meter chip measuring the current consumed by the terminal in real time is that, since the master control module is common grounded, all currents of the terminal will ultimately flow into a negative pole of the battery from GND of the master control module, a resistance Rc with a fixed small resistance value is required to be cascaded between the GND of the master control module and the negative pole of the battery in hardware design, and the real-time current consumed by the terminal is calculated by detecting the voltage across the Rc in real time.

Wherein, the battery current can serve as a direct reference parameter of the power consumption of the terminal, and other power consumption parameters such as the battery voltage and the battery temperature can serve as indirect reference parameters for estimating the power consumptions of all devices of the terminal; for example, with regard to a certain device with the same current consumption, if the battery temperature of the device is higher at present, it is to judge that the power consumption of the device is higher.

Figure 3:
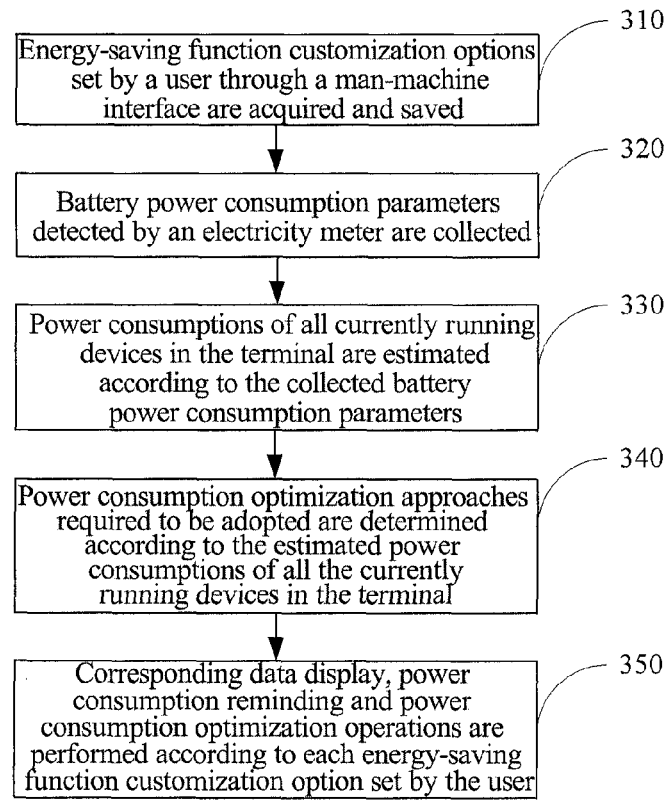
FIG. 3 is a flow diagram of the example of an energy-saving method for a portable terminal provided by the embodiment of the present document.

In the embodiment, with respect to the above example of the apparatus, the example of an energy-saving method for the portable terminal is also provided correspondingly, a flow of the method is as shown in FIG. 3, and the flowing steps are included.

In step 310, energy-saving function customization options set by a user through a man-machine interface are acquired and saved.

The energy-saving function customization options include one or more of data display options, power consumption reminding options and power consumption automatic optimization enabling options; wherein, the data display options include data display enabling and all displaying subitems, all the displaying subitems include displaying one or more subitems of the detected battery power consumption parameters, a maintainable remaining duration of use of battery and a remaining duration required for fully charging the battery in a charging state; and the power consumption reminding options include power consumption reminding enabling, reminding a long-term opened but unused device and reminding whether to execute the power consumption optimization approaches; wherein, the power consumption automatic optimization enabling options and/or the data display options are default options.

In step 320, the battery power consumption parameters detected by an electricity meter are collected.

The battery power consumption parameters detected by the electricity meter include one or more of the battery voltage, battery current, and battery temperature.

For example, within a regular interval of 30 mins, the current consumed by the terminal in real time and collected by the data acquisition module is saved every other 2 s, all current data saved within the time period of 30 mins are accumulated, and the accumulation sum is divided by the accumulation times, thereby obtaining the average current within the time period.

In step 330, power consumptions of all currently running devices in the terminal are estimated with respect to the collected battery power consumption parameters.

All the currently running devices in the terminal include currently running application programs and peripheral equipments.

The collected battery power consumption parameters are compared with corresponding preset alarm standard parameters, if the collected parameters exceed the corresponding alarm standard parameters, power consumptions of all the currently running application programs and peripheral equipments in the terminal are further determined.

For example, the average current calculated within the current time period is compared with the average current calculated within the last time period to obtain a difference value, and corresponding to distinctions of the running application programs or peripheral equipments (such as peripheral components including the LCD, motor and audio/video equipments and so on) between the former time period and the latter time period in the terminal or corresponding to differences between pre-measured current consumptions of all the devices, current consumptions caused by different application programs and peripheral equipments in the terminal at present are estimated, and power consumption information records of all the devices are formed.

In step 340, power consumption optimization approaches required to be adopted are determined according to the estimated power consumptions of all the currently running devices in the terminal.

If the average current consumed by the terminal within the current time period is greater than a preset threshold value (e.g., 160 ma), according to the information of the currently running devices in the currently running terminal at the point and the power consumption information records of all the devices, one or more in the following power consumption optimization approaches required to be executed are determined:

with respect to multiple idle but opened application programs or devices currently existing in the terminal, preferentially closing an application program with the longest idle time, or preferentially closing a device with the minimal impact on user experience, and temporarily keeping the remaining application programs or devices opened;

with respect to a relative high LCD brightness at present, progressively reducing the LCD brightness, and with regard to other peripheral components, also progressively reducing power consumptions of the other peripheral components.

In step 350, corresponding data display, power consumption reminding and power consumption optimization operations are performed according to each energy-saving function customization option set by the user.

One or more of the detected battery power consumption parameters (battery temperature, battery voltage and battery current), the maintainable remaining duration of use of battery or the remaining duration required for fully charging the battery in the charging state are displayed in real time according to the data display enabling and all displaying subitems; the user can acquire the current power consumption of the terminal through the displayed parameters and directly adopt to turn off certain devices or application programs which are turned on but unused for a long time.

When determining to perform the power consumption reminding according to the power consumption reminding enabling and corresponding reminding subitems, a prompt window is displayed, which reminds the user of the long-term opened but unused device and/or reminds whether to execute the power consumption optimization approaches.

In the prompt window, the current consumptions of all the application programs or peripheral equipments are orderly listed according to the size, which is convenient for the user to understand the power consumption reminding information and adopt certain consumption reduction operations initiatively. Meanwhile, a trigger key for the user determining whether to execute the power consumption optimization approaches will be set on the prompt window, and thus it can decide whether to execute the determined optimization approaches in the next step according to the user's wishes.

According to response information on the prompt window of the user or according to the power consumption automatic optimization enabling options, the determined power consumption optimization operations are executed.

In fact, if the user does not set the energy-saving function customization options, the above determined power consumption optimization operations can be directly adopted according to the power consumption automatic optimization enabling options serving as the default options.

The above example of the method also includes:

recording, displaying and saving the executed power consumption optimization operations, so that the user can make a query in latter period.

The energy-saving apparatus and method for the portable terminal provided by the above embodiment of the present document are not only applicable to the mobile phone terminals prevailing among people at present, but also applicable to any portable terminals such as a palmtop, a palm TV and a handheld game player and so on.

INDUSTRIAL APPLICABILITY

With the energy-saving apparatus and method for the portable terminal provided in the present document, the purpose of saving energy for the terminal in use can be achieved. Through the apparatus and method, it is only required to add an electricity meter chip with minimum power consumption and low costs to the circuit of the original terminal, by the electricity meter chip collecting data, not only a large amount of adequate power consumption information can be acquired to guarantee the data accuracy, but also the CPU consumption can be saved, which is easy to implement; by analyzing, displaying the collected power consumption information and executing power consumption optimization, etc, positioning and optimization can be performed on the power consumption problem from an overall perspective of the terminal, and a way of interacting with users can be used to make the power consumption information easier to be understood and operated by the users, which achieves the purpose of saving energy for the terminal in use. Moreover, with the apparatus and method provided in the present document, the development efficiency of the terminals whose power consumptions are reduced can be greatly enhanced.

What is claimed is:

1. An energy-saving apparatus for a portable terminal, comprising an electricity meter module, a data acquisition module, a data analysis module and a power consumption optimization execution module, wherein:

the electricity meter module is configured to: detect battery power consumption parameters under driving of the data acquisition module;

the data acquisition module is configured to: drive the detection of the electricity meter module, and output the collected battery power consumption parameters to the data analysis module;

the data analysis module is configured to: estimate power consumptions of all currently running devices in the terminal according to the input battery power consumption parameters, and output a power consumption optimization instruction to the power consumption optimization execution module; and the power consumption optimization execution module is configured to: adopt corresponding power consumption optimization approaches according to the input power consumption optimization instruction; wherein, the electricity meter module is configured as that the battery power consumption parameters detected by the electricity meter module at least comprise a battery current;

the data analysis module is configured to: solve an average current of the battery currents collected by the data acquisition module at regular intervals, compare an average current of a current time period with an average current of a last time period to obtain a difference value, and corresponding to distinctions of all the running devices between a former time period and a latter time period or corresponding to differences between pre-measured current consumptions of all the running devices, obtain current consumptions of all the currently running devices to serve as corresponding power consumption estimations, and form power consumption information records of all the running devices.

2. The apparatus according to claim 1, further comprising a function setting module, wherein:

the function setting module is configured to: provide energy-saving function customization options for a user through a man-machine interface, and output the energy-saving function customization options selected by the user on the man-machine interface to the data analysis module; the energy-saving function customization options at least comprise power consumption automatic optimization enabling options;

the data analysis module is configured to: compare the battery power consumption parameters collected by the data acquisition module with corresponding preset alarm standard parameters, if the battery power consumption parameters collected by the data acquisition module exceed the corresponding alarm standard parameters, analyze the power consumptions of all the currently running devices, determine power consumption optimization approaches required to be adopted, and determine whether to perform power consumption optimization operation according to the input energy-saving function customization options.

3. The apparatus according to claim 2, further comprising a data display module, wherein:

the electricity meter module is configured as that the battery power consumption parameters detected by the electricity meter module further comprise one or two parameters of a battery voltage and a battery temperature;

the function setting module is configured as that the energy-saving function customization options provided by the function setting module further comprise one or more of data display options and power consumption reminding options; the function setting module is further configured to output the energy-saving function customization options to the data display module;

the data analysis module is further configured to: output a data display instruction to the data display module according to the data display options; output a window prompt instruction to the data display module according to the power consumption reminding options; and output a corresponding power consumption optimization instruction to the power consumption optimization execution module according to the power consumption automatic optimization enabling options;

the data display module is configured to: display a prompt window according to the window prompt instruction to remind the user to execute the power consumption optimization approaches; and display at least one or more parameters of the battery current, battery temperature and battery voltage in the battery power consumption parameters in real time according to the data display instruction.

4. The apparatus according to claim 3, wherein, the function setting module is configured as that the data display options provided by the function setting module comprise data display enabling and all displaying sub-items, all the displaying subitems comprise displaying one or more of the detected battery power consumption parameters, a maintainable remaining duration of use of battery and a remaining duration required for fully charging the battery in a charging state; and the power consumption reminding options comprise power consumption reminding enabling, reminding an opened but unused device and reminding whether to execute the power consumption optimization approaches;

the display module is configured as that the prompt window displayed by the data display module comprises reminding the opened but unused device and reminding whether to execute the power consumption optimization approaches; and the parameters displayed in real time further comprise the maintainable remaining duration of use of battery and the remaining duration required for fully charging the battery in the charging state.

5. The apparatus according to claim 4, wherein, the data analysis module is configured to: when the average current of the current time period is greater than a preset threshold value, according to information records of all the currently running devices and the power consumption information records of all the currently running devices, adopt any one of following approaches:

when determining that power consumption reminding is required to be performed according to the power consumption reminding enabling and corresponding reminding subitems, reminding the user of whether to close the long-term opened but unused device and/or reminding whether to execute the power consumption optimization approaches through the prompt window displayed by the data display module;

according to response information on the prompt window of the user returned by the data display module or according to the power consumption automatic optimization enabling options, executing any one or more of following power consumption optimization operations through the power consumption optimization execution module:

with respect to multiple idle but opened devices currently existing in the terminal, preferentially closing a device with a longest idle time through the power consumption optimization execution module, or preferentially closing a device with a minimal impact on user experience;

with respect to a state that display screen brightness is comparatively high at present, progressively reducing the display screen brightness through the power consumption optimization execution module, and/or progressively reducing power consumptions of other devices.

6. An energy-saving method for a portable terminal, comprising:

collecting battery power consumption parameters detected by an electricity meter;

estimating power consumptions of all currently running devices in the terminal according to the collected battery power consumption parameters; and determining power consumption optimization approaches required to be adopted according to the estimated power consumptions of all currently running devices; wherein, the collected battery power consumption parameters detected by the electricity meter at least comprise a batter current; and the step of estimating power consumptions of all currently running devices in the terminal according to the collected battery power consumption parameters comprises:

solving an average current of the battery currents at regular intervals, comparing an average current of a current time period with an average current of a last time period to obtain a difference value, and corresponding to distinctions of all the running devices between a former time period and a latter time period or corresponding to differences between pre-measured current consumptions of all the running devices, obtaining current consumptions of all the currently running devices to serve as corresponding power consumption estimations, and forming power consumption information records of all the running devices.

7. The method according to claim 6, wherein, the step of determining power consumption optimization approaches required to be adopted according to the estimated power consumptions of all currently running devices comprises:

if the average current within the current time period is greater than a preset threshold value, according to information records of all the currently running devices and the power consumption information records of all the currently running devices, determining one or more of following power consumption optimization approaches required to be executed:

with respect to multiple idle but opened devices currently existing in the terminal, preferentially closing a device with a longest idle time through the power consumption optimization execution module, or preferentially closing a device with a minimal impact on user experience;

with respect to a state that display screen brightness is comparatively high at present, progressively reducing the display screen brightness through the power consumption optimization execution module, and/or progressively reducing power consumptions of other devices.

8. The method according to claim 7, wherein, before collecting the battery power consumption parameters detected by the electricity meter, the method further comprises:

providing energy-saving function customization options for a user through a man-machine interface, and acquiring the energy-saving function customization options selected by the user on the man-machine interface, wherein, the energy-saving function customization options comprise one or more of power consumption automatic optimization enabling options, data display options and power consumption reminding options; wherein, the data display options comprise data display enabling and all displaying subitems, all the displaying subitems comprise displaying one or more of the detected battery power consumption parameters, a maintainable remaining duration of use of battery and a remaining duration required for fully charging the battery in a charging state; and the power consumption reminding options comprise power consumption reminding enabling, reminding an opened but unused device and reminding whether to execute the power consumption optimization approaches.

9. The method according to claim 8, wherein, after determining the power consumption optimization approaches required to be adopted, the method further comprises:

performing corresponding data display, power consumption reminding and power consumption optimization operations according to the energy-saving function customization options set by the user.

10. The method according to claim 9, wherein, the collected battery power consumption parameters detected by the electricity meter further comprise one or two parameters of a battery voltage and a battery temperature; and the step of performing corresponding data display, power consumption reminding and power consumption optimization operations according to the energy-saving function customization options set by the user comprises:

displaying one or more parameters of the battery power consumption parameters, the maintainable remaining duration of use of the battery and the remaining duration required for fully charging the battery in the charging state in real time according to the data display options;

displaying a prompt window according to the power consumption reminding options, and reminding the user to close the opened but unused device and reminding whether to execute the power consumption optimization approaches; and according to response information on the prompt window of the user or according to the power consumption automatic optimization enabling options, executing the determined power consumption optimization approaches.

* * * * *